(12) United States Patent
Crisp et al.

(10) Patent No.: US 6,456,035 B1
(45) Date of Patent: *Sep. 24, 2002

(54) BATTERY CHARGER, METHOD OF AND SOFTWARE PROGRAM FOR OPERATING A BATTERY CHARGER, AND METHOD OF AND COMBINATION FOR CHARGING A BATTERY

(75) Inventors: Robert Crisp, Mukwonago; Kevin Glasgow, Campbellsport; Joseph Willhide, Brookfield; Glen C. Spence, New Berlin, all of WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/672,620

(22) Filed: Sep. 29, 2000

Related U.S. Application Data (63) Continuation-in-part of application No. 09/374,558, filed on Aug. 13, 1999, now Pat. No. 6,222,343.
(60) Provisional application No. 60/096,524, filed on Aug. 14, 1998.

(51) Int. Cl.7 ......................... H01M 10/44; H01M 10/46
(52) U.S. Cl. ......................................... 320/106; 320/110
(58) Field of Search ................................ 320/106, 110, 320/128, 134, 136, 150

(56) References Cited

U.S. PATENT DOCUMENTS

| 3,105,183 A | 9/1963 | Hysler et al. |
|---|---|---|
| 3,113,255 A | 12/1963 | Eberts |
| 3,735,232 A | 5/1973 | Fister |
| 3,943,423 A | 3/1976 | Hoffman |
| 4,041,369 A | 8/1977 | King et al. |
| 4,665,354 A | 5/1987 | Sada et al. |
| 4,962,462 A | 10/1990 | Fekete |
| 5,049,804 A | 9/1991 | Hutchings |
| 5,113,127 A | 5/1992 | Hoffman et al. |
| 5,187,422 A | 2/1993 | Izenbaard et al. |
| 5,200,690 A | 4/1993 | Uchida |
| 5,420,494 A | 5/1995 | Lu |
| 5,489,836 A | 2/1996 | Yuen |
| 5,519,302 A | 5/1996 | Mino et al. |
| 5,523,668 A | 6/1996 | Feldstein |
| 5,543,702 A | 8/1996 | Pfeiffer |
| 5,612,607 A | 3/1997 | Nicolai |
| 5,633,574 A | 5/1997 | Sage |
| 5,644,211 A | 7/1997 | Tokuyama |
| 5,686,808 A | 11/1997 | Lutz |
| 5,691,622 A | 11/1997 | Mack et al. |
| 5,694,023 A | 12/1997 | Podrazhansky et al. |
| 6,222,343 B1 * | 4/2001 | Crisp et al. ............... 320/110 |

* cited by examiner

Primary Examiner—Edward H. Tso
(74) Attorney, Agent, or Firm—Michael Best & Friedrich LLP (57) ABSTRACT

A battery charger, a method for charging a battery, and a software program for operating the battery charger. The battery charger is capable of charging different types of batteries and capable of operating on alternate sources of AC power or alternate sources of DC power. Also, the battery charging circuit will not operate if one of the power source, the battery, the power switch means and the control means (including the Microcontroller) malfunctions. In addition, in the battery charging circuit, the battery under charge enables the operation of the battery charging circuit.

49 Claims, 7 Drawing Sheets

BATTERY CHARGER, METHOD OF AND SOFTWARE PROGRAM FOR OPERATING A BATTERY CHARGER, AND METHOD OF AND COMBINATION FOR CHARGING A BATTERY

This application claims the benefit of prior filed co-pending patent application, Ser. No. 09/374,558, filed on Aug. 13, 1999, issued as U.S. Pat. No. 6,222,343 B1, on Apr. 24, 2001, which claims the benefit of provisional patent application, Ser. No. 60/096,524, filed on Aug. 14, 1998.

BACKGROUND OF THE INVENTION

The present invention relates to battery chargers and, more particularly, to an improved battery charger and battery charging circuit.

A typical battery charger includes a battery charging circuit which is connectable to a power source and to a rechargeable battery and which is operable to charge the battery.

SUMMARY OF THE INVENTION

One of the problems with some existing battery chargers is that the battery charging circuit does not operate continuously on different sources of AC power.

Another problem with some existing battery chargers is that the battery charging circuit does not provide charge current to the batteries as efficiently as possible.

A further problem with some existing battery chargers is that some battery chargers are not able to charge both Nickel-cadmium (NiCd) and Nickel-Metal Hydride (NiMH) batteries.

Yet another problem with some existing battery chargers is that, in order to charge both types of Nickel battery chemistries, these battery chargers require special identification components.

Another problem with existing battery chargers is that the battery charging circuit does not shut down if one of the components of the battery charging circuit fails or malfunctions. Specifically, some other existing battery chargers utilize topologies in which charge and control components are separate. In such existing chargers, a single failure on the printed circuit board or battery could result in uncontrolled charge and, thus, overcharging.

A further problem with existing battery chargers is that a separate low voltage supply is required to control the battery charging circuit.

Yet another problem with some existing battery chargers is that several separate components and circuits are necessary to perform the required functions of the battery charger, increasing the cost and complexity of the battery charger.

The present invention provides a battery charger that alleviates the problems with existing battery chargers. The invention provides a battery charger for charging different types of batteries and capable of operating on alternate sources of AC power or on alternate sources of DC power. Also, the invention provides a battery charging circuit which will not operate if one of the power source, the battery, the power switch means and the control means (including the Microcontroller) malfunctions. In addition, the invention provides a battery charging circuit in which the battery under charge enables the circuit and, in some embodiments, powers the Microcontroller. The battery charging circuit operates even if the battery under charge is in a low or depleted state (i.e., the battery is in a depleted state).

In one aspect, the invention provides a battery charger comprising a battery charging circuit electrically connectable to a power source and to a battery and operable to charge the battery, the circuit including power switch means operable to provide power from the power source to charge the battery, and control means for operating the circuit, the control means being electrically connected to the circuit and providing a control signal to the power switch means to control the power switch means, the power source, the battery, the power switch means and the control means being electrically connectable by the circuit so that, when one of the power source, the battery, the power switch means and the control means malfunctions, the circuit does not operate to charge the battery. Preferably, the circuit electrically connects the power source, the battery, the power switch means and the control means in series.

In another aspect, the invention provides a method of charging a battery, the method comprising the acts of providing the battery charger, connecting the battery charger to the power source, connecting the battery to the battery charger, electrically connecting the power source, the battery, the power switch means and the Microcontroller so that, when the battery is connected to the circuit, if one of the power source, the battery, the power switch means and the Microcontroller malfunctions, the circuit will not operate to charge the battery, charging the battery, monitoring the circuit to determine when one of the power source, the battery, the power switch means and the Microcontroller malfunctions, and, if one of the power source, the battery, the power switch means and the Microcontroller malfunctions, preventing the circuit from charging the battery. Preferably, the act of electrically connecting the power source, the battery, the power switch means and the Microcontroller includes electrically connecting the power source, the battery, the power switch means and the control means in series.

In a further aspect, the invention provides a battery charger comprising a battery charging circuit connectable to a power source and to a battery and operable to charge the battery, and a Microcontroller electrically connected to and for operating the circuit.

In another aspect, the invention provides a battery charger comprising a battery charging circuit operable to power a battery when the battery is connected to the circuit such that the battery enables the circuit.

In yet another aspect, the invention provides a method for operating the battery charger, the method comprising the acts of providing a battery, connecting the battery to the battery charging circuit, and supplying power from the battery to the Microcontroller to operate the Microcontroller.

In another aspect, the invention provides a software program for operating the battery charger.

One advantage of the present invention is that the battery charger will operate continuously on alternate sources of AC power, such as alternators, generators, inverters and welders.

Another advantage of the present invention is that the battery charging circuit provides charge current to the batteries as efficiently as possible.

A further advantage of the present invention is that the battery charger is able to charge both types of Nickel battery chemistries in the same charger.

Yet another advantage of the present invention is that the battery charger is able to charge both types of Nickel battery chemistries without any special identification schemes and/or electronic components.

Another advantage of the present invention is that the power supply, power switch means, battery and Microcontroller are connected in a circuit such that, if any one of these components fails, the battery charging circuit will shut down.

A further advantage of the present invention is that the battery being charged provides power to the low voltage supply which, in turn, enables the battery charging circuit.

Yet another advantage of the present invention is that the Microcontroller includes integrated components which perform many of the required functions of the battery charger, reducing the cost and complexity of the battery charger.

Other features and advantages of the invention will become apparent to those skilled in the art upon review of the following detailed description, claims and drawings.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION OF THE PREFERRED EMBODIMENT

Figure 1:
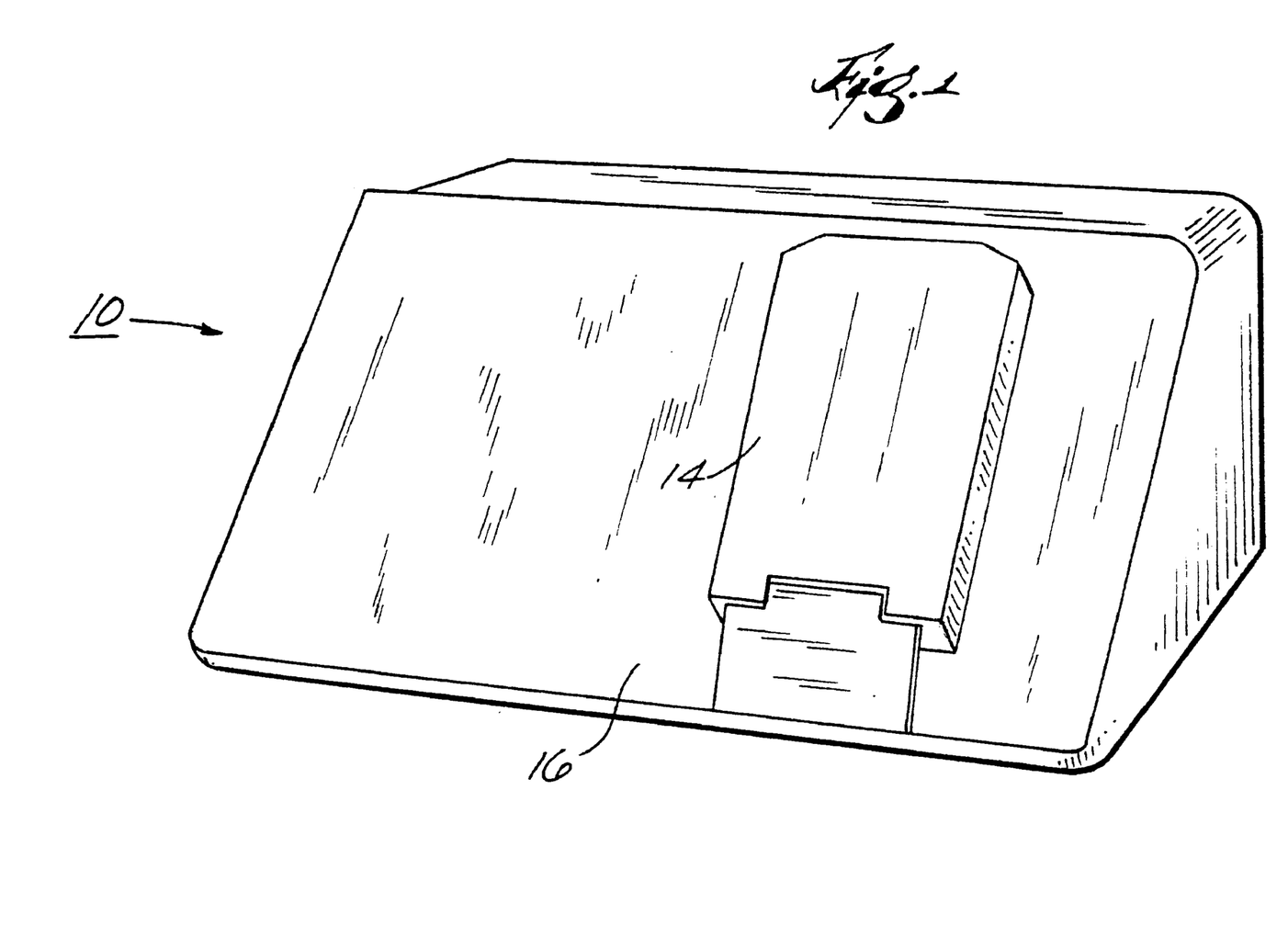
FIG. 1 is a perspective view of a battery charger embodying the present invention.
Figure 2:
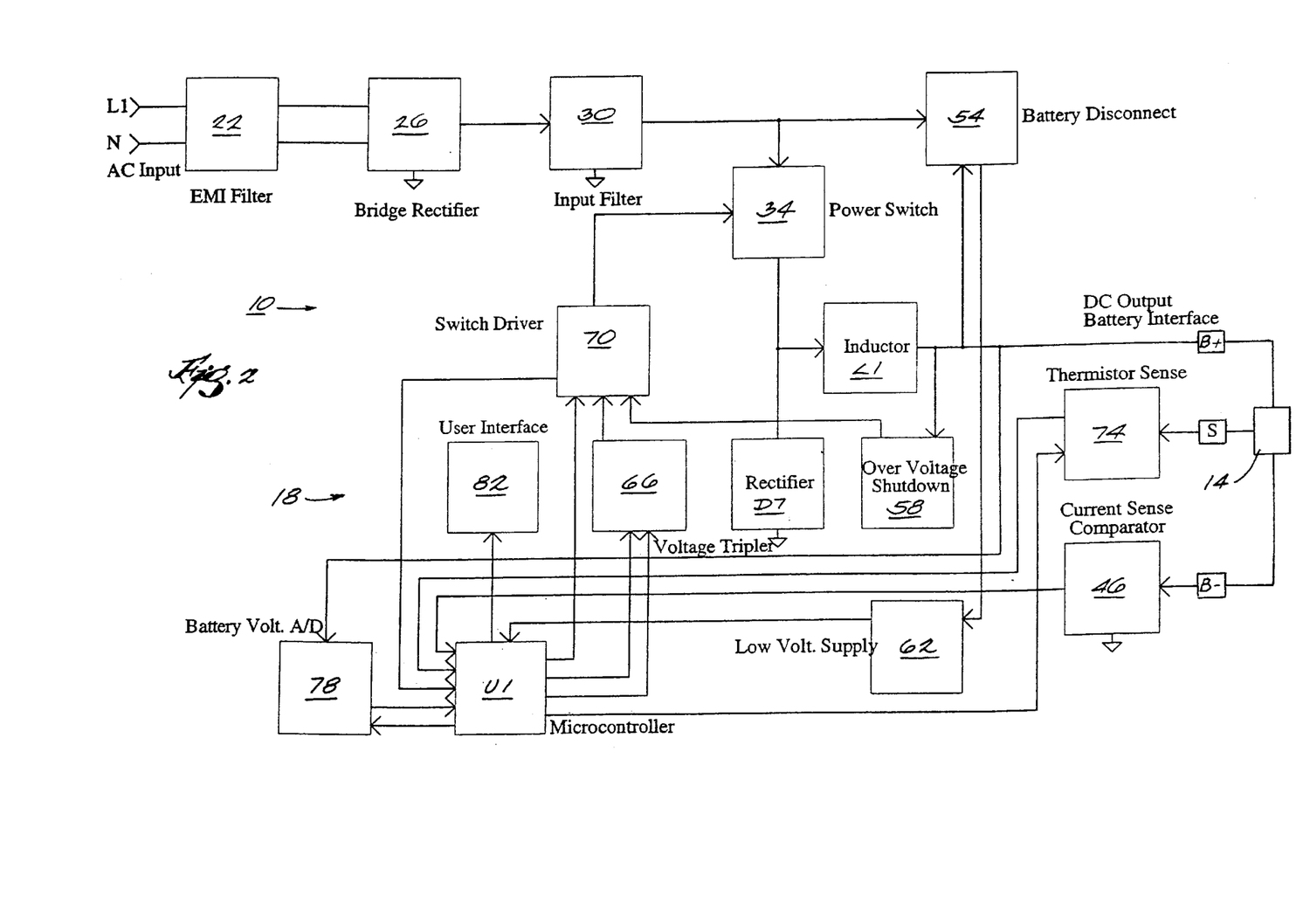
FIG. 2 is a block diagram of the battery charger and a battery charging circuit.
Figure 3:
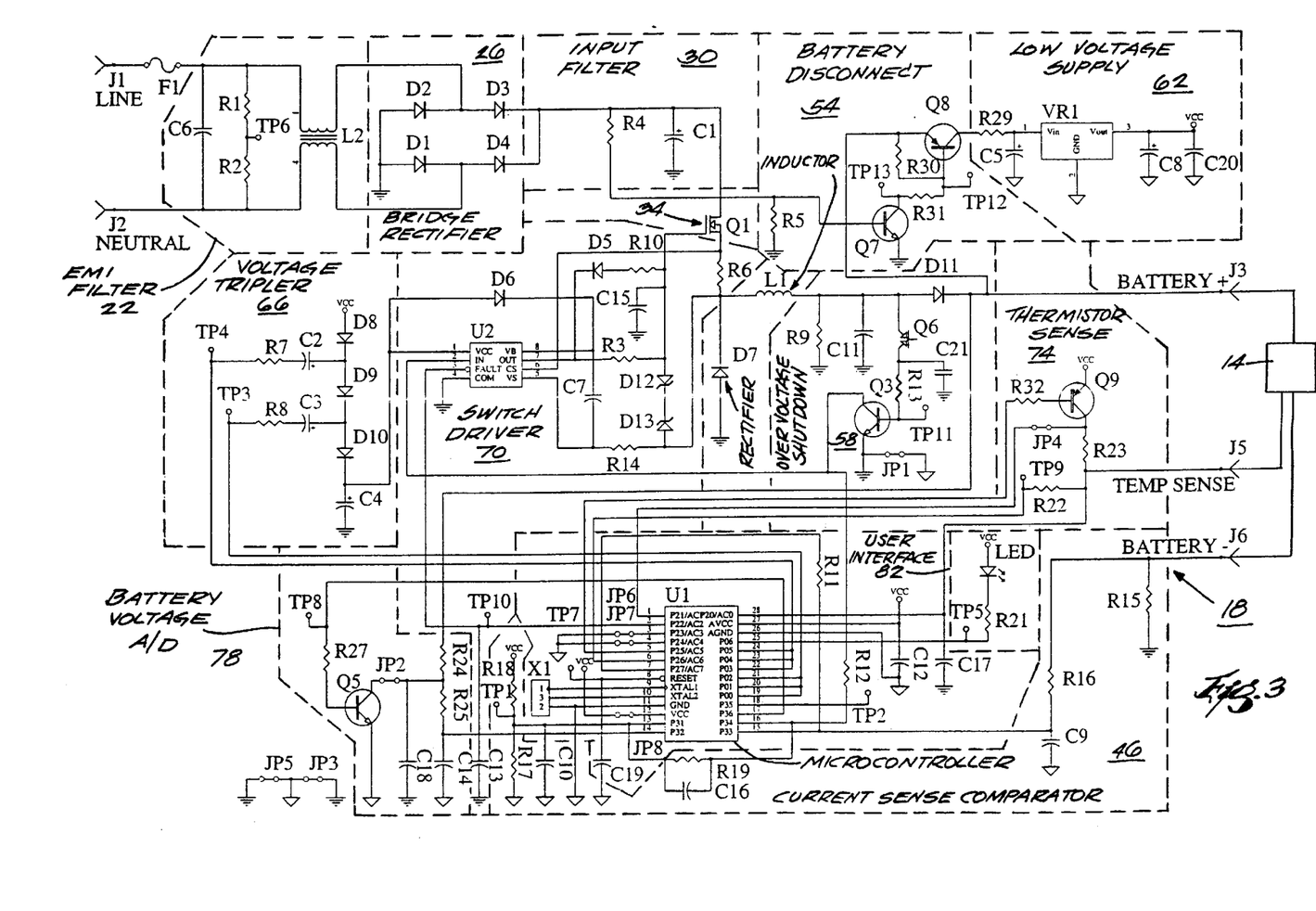
FIG. 3 is a schematic diagram of the portions of the battery charging circuit illustrated in FIG. 2.

A battery charger 10 embodying the invention is illustrated in FIG. 1, in a block diagram in FIG. 2 and schematically in FIG. 3. The battery charger 10 is connectable to any type of AC power source (not shown), such as an alternator, a generator, an inverter or a welder, to charge a battery 14. The battery 14 may be any voltage from 9.6 V to 18 V and may be any type of battery. In the illustrated construction, the battery 14 is a Nickel-cadmium (NiCd) or a Nickel-Metal Hydride (NiMH) battery. The battery charger 10 includes a housing 16 supporting the battery 14 and a battery charging circuit 18 which is connectable to the power source and to the battery 14 and which is operable to charge the battery 14.

The battery charging circuit 18 includes an EMI filter circuit 22 (capacitor C6, inductor L2) which filters out electrical noise of the input power source during operation of the battery charger 10. The battery charging circuit 18 further includes a bridge rectifier 26 (diodes D1–D4) which rectifies or converts the alternating current (AC) and the voltage passing through the EMI filter circuit 22 into direct current (DC) and the voltage required for the creation of the charging current for the battery 14. An input filter 30 (capacitor C1) filters or smoothens out the DC voltage (ripple) created by the AC to DC rectification function of the bridge rectifier 26.

The battery charging circuit 18 also includes a "buck regulator". The buck regulator includes power switch means 34 (i.e., a MOSFET transistor Q1), a rectifier (diode D7), an inductor (L1), and the battery 14 under charge. In general, the power switch means 34 sre electrically connected to the input filter 30 and functions like a mechanical on/off switch, except under electronic control. It should be understood that, in other constructions (not shown), another electronic switching component, such as, for example, a relay or a SCR switch, or a mechanical switch could be included in the power switch means 34.

The rectifier (D7) "free wheels" or conducts, completing the circuit when the power switch means 34 turns off. The power switch means 34 apply or turn off current and voltage to the inductor (L1). The inductor (L1) has magnetic properties that work together with the capacitive properties of the battery 14 to store energy during the time the power switch means 34 is off.

The battery charging circuit 18 also includes a current sense comparator circuit 46 (resistors R18, R17, capacitor C10, resistor R19, capacitors C16, C9, resistors R16, R15) to measure the battery charge current and provide information to a Microcontroller (U1). The Microcontroller (U1) is a programmable, integrated component which consolidates and controls many of the functions of the battery charger 10. The Microcontroller (U1) monitors the status of the battery 14 before, during and after charging and monitors and controls the operation of the battery charging circuit 18 by outputting a control signal to the buck regulator before, during and after charging.

The battery charging circuit 18 also includes a battery disconnect circuit 54 (resistors R4, R5, transistor Q7, resistors R30, R31, transistor Q8) which disengages the battery charger control circuit if the battery charger 10 is unplugged or if the line voltage is too low. An over voltage shutdown circuit 58 (transistor Q6, resistor R13, transistor Q3, capacitor C21) turns off the power switch means 34 when an over voltage condition exists on the output of the inductor (L1).

The power source, the battery 14, the power switch means 34 and the Microcontroller (U1) are electrically connected by the battery charging circuit 18 so that, when the battery 14 is connected to the battery charging circuit 18, if any one of the power source, the battery 14, the power switch means 34 and the Microcontroller (U1) malfunction, the battery charging circuit 18 will not operate to charge the battery 14.

The battery charging circuit 18 also includes a low voltage supply circuit 62 (resistor R29, capacitor C5, voltage regulator VR1, capacitors C8, C12) which steps down, regulates and provides a low voltage supply to power the control circuits and, specifically, the Microcontroller (U1). A voltage tripler circuit 66 (resistors R7, R8, capacitors C2, C3, C4, diodes D8, D9, D10) creates a low voltage power supply which is dependent on the Microcontroller (U1). The voltage tripler circuit 66 supplies power to a switch driver circuit 70 (MOSFET driver U2, diode D6, capacitor C7, diode D5, resistor R3, diodes D12, D13, resistor R6). The switch driver circuit 70 outputs a drive signal to turn the power switch means 34 on or off on reception of a control signal from the Microcontroller (U1). The switch driver circuit 70 also transforms and conditions the control signal from the Microcontroller (U1) to the required state and level for the power switch means 34.

A thermistor sense circuit 74 (resistors R22, R23, R32, transistor Q9) provides a means for identifying the type of battery 14 (i.e., NiCd or NiMH) connected to the battery charging circuit 18. The thermistor sense circuit 74 senses and conditions the thermistor signal from a NiCd battery or a NiMH battery for application (as the identification signal) to the Microcontroller (U1). A battery voltage A/D circuit 78 (resistor R27, transistor Q5, resistors R24, R25, capacitor C14, resistor R11) works together with the Microcontroller (U1) to form a voltage conversion function. This conversion process is required to precisely measure the voltage of the battery 14 before and during the charging cycle. The battery voltage A/D circuit 78 is electrically connected to the battery 14. A user interface circuit 82 (light emitting diode LED, resistor R1) provides feedback to the user on the status of the battery charger 10 and the battery charging process.

The following sections describe the functions of the individual circuit blocks. Each block represents a circuit function. Refer to the Block Diagram FIG. 2 and to the Schematic Diagram (FIG. 3) for information on the block locations and inter-connectivity.

EMI Filter, Bridge Rectifier, Input Filter Circuits

The EMI filter 22 (capacitor C6, inductor L2), bridge rectifier 26 (diodes D1–D4) and input filter 30 (capacitor C1) provide a standard way of converting AC line power to a "DC Bus" voltage used as an input to the buck regulator (the power switch means 34, the rectifier (diode D7), the inductor (L1) and the battery 14).

Power Switch, Rectifier Inductor, Current Sense Comparator Circuits

When the power switch means 34 (i.e., MOSFET transistor Q1) turn on, current is supplied from the "DC Bus" to the battery 14 through the inductor (L1). The inductor (L1) establishes a rise time and, at a predetermined peak level, the power switch means 34 are shut off. At the moment the power switch means 34 turn off, the rectifier (diode D7) conducts, or "free wheels" providing the closed loop consisting of the rectifier (diode D7), the inductor (L1), and the battery 14. This allows inductor (L1) to discharge its stored energy into the battery 14. The current decays down to a pre-determined minimum level at which point the power switch means 34 is turned back on, and the charging cycle is repeated.

The on/off levels of current are determined by hysteretic control of the current sense comparator circuit 46 (resistors R18, R17, capacitor C10, resistor R19, capacitors C16, C9, resistors R16, R15). The Microcontroller (U1) contains an integrated comparator which is used to perform this function along with the other circuit components. The output of the comparator is "gated" within the Microcontroller (U1) to allow for control and monitoring of the power circuit (EMI Filter 22, bridge rectifier 26, input filter 30, power switch means 34, inductor (L1), rectifier (diode D7)). The Microcontroller (U1) controls the power circuit to implement a circuit turn on delay, a circuit turn off for battery voltage and temperature measurement, and charge termination. Power circuit monitoring is also performed by the Microcontroller (U1) to check for correct on time and frequency of the power switch means 34. The gated signal of the comparator is in the form of a constantly varying pulse train which serves to regulate the on-time of power switch means 34 which, in turn, regulates charge current.

Voltage Tripler Circuit

The components of the circuit 66 (resistors R7, R8, capacitors C2, C3, C4, diodes D8, D9, D10) function as a voltage tripler. This is accomplished by receiving two separate complementary outputs from the Microcontroller (U1) operating at a fixed 50% duty cycle and frequency. The voltage tripler circuit 66 creates a low voltage power supply of sufficient level that is dependent on the Microcontroller (U1). This power supply is used to energize the high side MOSFET driver circuit (switch driver circuit 70). The complementary 5 V DC square wave signals from the Microcontroller (U1) are capacitively coupled as a result of this tripler circuit providing a 13 V DC level (15 V DC minus three diode drops D8–D10).

This method provides a robust way of fault protection. The software controls the fixed frequency square wave outputs. If for any reason the Microcontroller (U1) malfunctions, glitches or latches up, and causes the software program to stop running or to run erratically, the square waves would stop or vary (not 50% duty cycle) and the tripler output voltage (seen at capacitor C4) would decay and fall below a voltage threshold determined by the MOSFET driver (U2), thus turning off the power switch means 34 and the charge current. This voltage tripler method relies only on a 50% duty cycle running square wave and is also frequency dependent. If the Microcontroller (U1) ran at a faster clock rate, the voltage tripler circuit 66 would also droop and cause a shutdown. Additionally, the voltage tripler circuit 66 can only supply a certain amount of power. If the MOSFET switch driver (U2) operates at too high of a frequency or for too long of an on-time, the tripler level (seen at capacitor C4) would be depleted and again the power switch means 34 would be turned off and the charge current would be terminated.

Switch Driver Circuit

The voltage tripler circuit 66 supplies power to the switch driver circuit 70 or high side MOSFET driver circuit 70 (MOSFET driver U2, diode D6, capacitor C7, diode D5, resistors R3, R10, R14, diodes D12, D13, resistor R6). The high side switch driver circuit 70 supplies the needed gate voltage for the power switch means 34. This voltage needs to be higher than the "DC Bus" voltage seen at the inductor (L1) by approximately 10 V DC. So, in effect, the power switch means 34 gate voltage is stacked on top of the DC voltage at the inductor (L1) by 10 V. This allows the power switch means 34 to become fully enhanced or turned on.

The MOSFET driver (U2) has its own charge pump function to accomplish the task of taking the voltage tripler voltage and stacking it on the "DC Bus" voltage (diode D6, capacitor C7). The MOSFET driver (U2) also has under voltage and over current protection and a fault output signal which is fed back to the Microcontroller (U1). Resistors (R3, R10) set the rise and fall time of the power switch means 34 to help control switching losses. Resistor (R6) is a current sensing resistor to provide additional MOSFET protection (i.e., poor power quality, surges, etc.).

Low Voltage Supply Circuit

The low voltage supply circuit 62 (resistor R29, capacitor C5, voltage regulator VR1, capacitors C8, C20) provides regulated 5 V DC power to the Microcontroller (U1) and external control circuitry (the current sense comparator circuit 46, the battery disconnect circuit 54, the low voltage supply circuit 62, the voltage tripler circuit 66, the switch driver circuit 70, the thermistor sense circuit 74, the battery voltage A/D circuit 78 and the user interface 82). The power supplied to the input of the low voltage supply circuit 62 is provided by the battery 14 being charged.

Battery Disconnect Circuit

The battery disconnect circuit 54 (resistors R4, R5, transistor Q7, resistors R30, R31, transistor Q8) disengages the battery charger control circuit (the Micrcontroller (U1) and the external control circuitry) if the battery charger 10 is unplugged or if the line voltage is too low. This prevents the battery 14 from discharging if it is left in the battery charger 10 and the AC line voltage goes to zero or if the battery charger 10 is unplugged. Additionally, the battery charger 10 draws only mWatts of power from the AC input when no battery is connected to the battery charger 10.

Over Voltage Shutdown Circuit

The over voltage shutdown circuit 58 (transistor Q6, resistor R13, transistor Q3, capacitor C21) turns off the power switch means 34 when an over voltage condition exists on the output of the inductor (L1). The over voltage shut down circuit 58 is electrically connected to the switch driver circuit 70. An over voltage condition can occur when a battery 14 is removed from the battery charging circuit 18 during charging and/or under a fault condition. The over voltage shut down circuit 58 turns the power switch means 34 off via the switch driver circuit 70 by "clamping" the control signal from the Microcontroller (U1) off.

Microcontroller

The function of Microcontroller (U1) is to reside as the "heart" of the battery charger 10. The Microcontroller (U1) is programmable and operates to provide five main functions: identify the battery 14 prior to charge; monitor and control the power circuit and the charge current applied to the battery 14; determine the voltage of the battery 14 while charging; determine the temperature of the battery 14 before, during, and after charge; and signal to the user the charging state of the battery charger 10.

It should be understood that, in other constructions (not shown), the functions performed by the Microcontroller (U1) can be performed by separate electronic components and circuits.

Battery Voltage A/D Circuit

The battery voltage A/D circuit 78 (resistor R27, transistor Q5, resistors R24, R25, capacitor C14, Microcontroller U1, resistor R11) converts the analog battery voltage into a digital representation to be processed by the Microcontroller (U1). It is based on a dual slope analog to digital converter technique, whereby a capacitor (C14) is charged for a fixed period of time from a known voltage reference (integration) and then discharged to the same known voltage reference (de-integration). The time for the capacitor (C14) to discharge to the reference is measured by the Microcontroller (U1) and converted into a battery voltage.

Thermistor Sense Circuit

The thermistor sense circuit 74 (resistors R22, R23, R32, transistor Q9) conditions and provides the ability to apply and remove a voltage source needed to measure the NiCd and NiMH battery thermistor resistance. Due to the fact that the NiCd and NiMH batteries have different thermistor resistance values, the voltage drop created across the thermistor when the voltage source is applied to the battery 14 is different. The voltage drop is measured by the on board A/D converter in the Microcontroller (U1), and the result is compared against calculated values stored in the Microcontroller (U1). The result of the comparisons yield the ability to determine the battery chemistry (NiCd or NiMH), the temperature of the battery 14, and whether or not the thermistor is open or shorted.

User Interface

The user interface 82 (light emitting diode LED, resistor R1) signals to the user the charging state of the battery charger 10. The user interface 82 is in the form of a light emitting diode (LED) device. The states of the LED are "Off", "On", and "Flashing". The LED is "Off" when no battery is present, when the battery charger 10 is ready for charge, when charging is complete, or during maintenance charging. The LED is "On" during charging. The LED is "Flashing" when the battery 14 is too hot or too cold to charge.

Circuit Operation

When a battery 14 is inserted and the battery charger 10 is plugged in, operation is as follows:

The battery 14 is inserted into the battery charger 10. The voltage regulator (VR1) and associated circuitry turn on and provide regulated 5 V DC to the Microcontroller (U1). The Microcontroller (U1) initializes a start up sequence. After a delay, the voltage tripler circuit 66 pumps up to its steady state level of approximately 13 V DC causing the MOSFET driver (U2) to come out of undervoltage lock out. The Microcontroller (U1) gates the charge current comparator "on" and a 5 VD C signal (leading edge) is supplied to the MOSFET driver (U2) which in turn provides a 12 V signal from gate to source on the power switch means 34 (i.e., the MOSFET transistor Q1). The power switch means 34 turns on, starting current flow through inductor (L1) and into the battery 14.

During start up, the thermistor sense circuit 74 identifies the type of battery 14 (i.e., NiCd or NiMH) connected to the battery charging circuit 18, based on the thermistor value of the battery 14. The thermistor sense circuit 74 provides the battery type identification signal to the Microcontroller (U1) so that the Microcontroller (U1) can control the battery charging circuit 18 to charge the battery 14 in an appropriate manner for the given battery type.

The current sense comparator circuit 46 monitors the current levels and appropriately turns the power switch means 34 on and off, regulating the current. During the off times, the voltage tripler circuit 66 replenishes the charge on capacitor (C4) keeping the necessary voltage levels up. The Microcontroller (U1) monitors voltage and temperature of the battery 14 to terminate the charging process at the appropriate time (the termination point) for the type of battery 14 (i.e., NiCd or NiMH).

In the event that the battery 14 is removed from the battery charger 10, the over voltage shutdown circuit 58 will immediately turn the power switch means 34 off, preventing high voltage from appearing at the output. A resistor (R29) and capacitor (C5) on the input to the low voltage supply circuit 62 serve to protect the voltage regulator (VR1) of the low voltage supply circuit 62 during such a condition.

One feature of the battery charger 10 is that the control and sensing circuitry are in series with the battery charging circuit 18 via the Microcontroller (U1). As discussed above, some other existing battery chargers utilize topologies in which charge and control components are separate. In such existing chargers, a single failure on the printed circuit board or battery could result in uncontrolled charge and, thus, overcharging.

While not in use but "plugged in" (connected to the power source), the battery charger 10 is essentially off and not powered. There is no chance for the Microcontroller (U1) to become damaged or latched up (i.e., due to poor power quality (voltage spikes and/or surges)) while attached to AC power supply. This is because the control circuitry and Microcontroller (U1) receive power from the battery 14, and no battery is present. The control circuitry, including the Microcontroller (U1), is off and disconnected from any power supply.

When voltage is applied to the input power source, the battery charging circuit 18 will remain inactive and will draw only mWatts of power from the AC line input power source unless a battery 14 is connected to the battery charging circuit 18. When the battery 14 is attached to the DC output, the battery charging circuit 18 becomes operational. Because the battery charging circuit 18 remains inactive until the battery 14 is connected, the battery charging circuit 18 is very efficient, even if the battery charger 10 is left attached to the AC line but unattended and not being utilized to charge a battery 14.

The battery charging circuit 18 becomes active when the battery 14 is attached because the battery 14 is used as the source of power for the control circuit, including the Microcontroller (U1). The battery 14 powers the low voltage supply circuit 62 which, in turn, powers the Microcontroller (U1). When the Microcontroller (U1) becomes active, the Microcontroller (U1) checks and/or conditions the battery 14, via the battery voltage A/D circuit 78 and the thermistor sense circuit 74 prior to preventing or beginning charging of the battery 14. If charging begins, the Microcontroller (U1) signals the switch driver circuit 70 to begin turning the power switch means 34 on and off to create charge current via the buck regulator (the power switch means 34, the rectifier (diode D7), the inductor (L1) and the battery 14). If the Microcontroller (U1) does not signal the switch driver circuit 70, the battery charging circuit 18 and the power switch means 34 remain inactive. Because on/off signals from the Microcontroller (U1) are used to create power for the switch driver circuit 70, if the switch driver circuit 70 has no power, the power switch means 34 cannot turn on.

Figure 4:
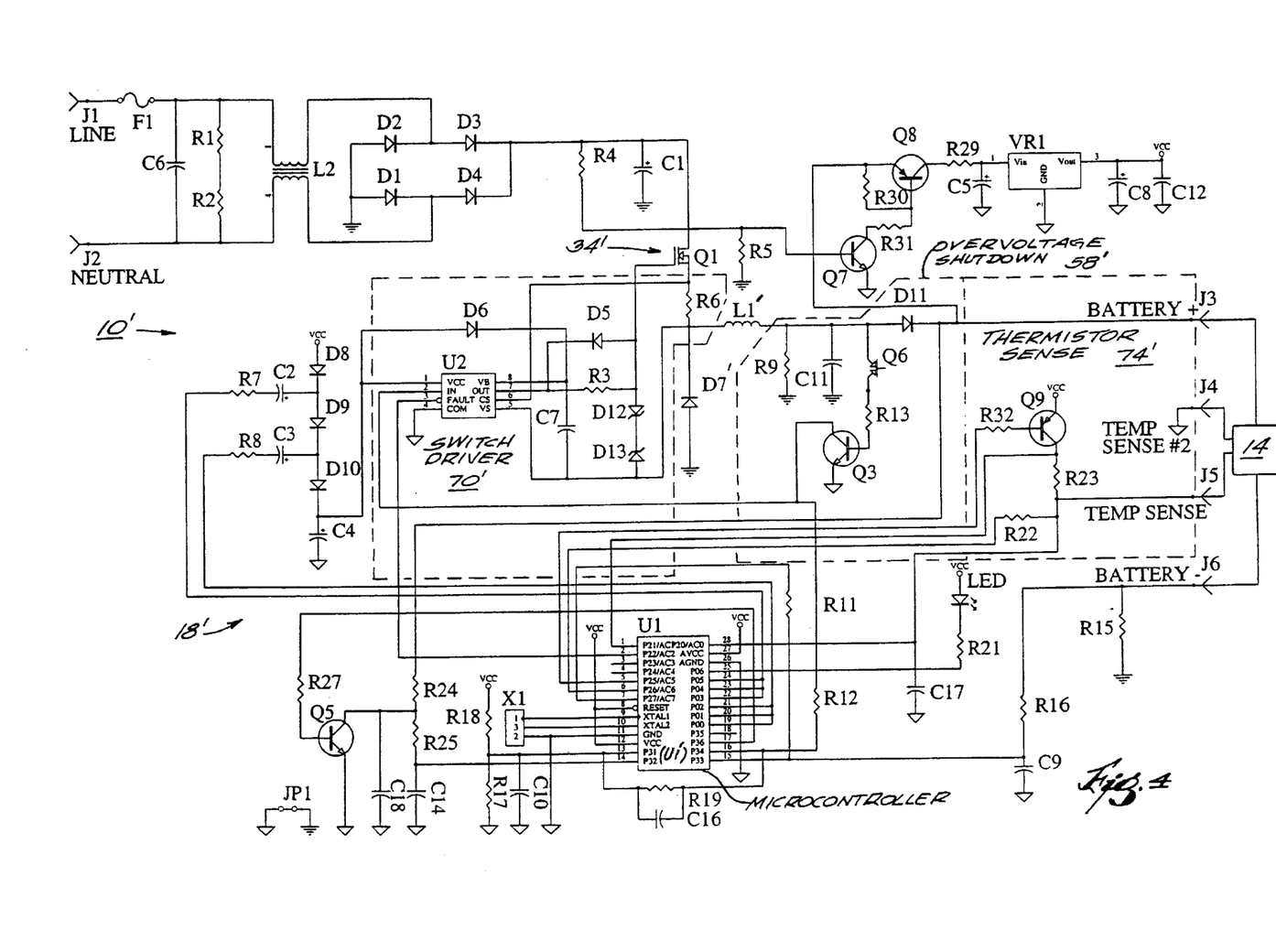
FIG. 4 is a schematic diagram of an alternative embodiment of the battery charging circuit illustrated in FIG. 2.

FIG. 4 illustrates another embodiment of a battery charging circuit 18'. Common elements are identified by the same reference numbers. The battery charging circuit 18' is similar to the battery charging circuit 18, as described above, with the following differences:

(1) the battery charging circuit 18' does not include the capacitor (C12);

(2) the over voltage shut down circuit 58' does not include the capacitor (C21);

(3) the switch driver circuit 70' does not include the resistors (R10 and R14) and capacitor (C13); and (4) the thermistor sense circuit 74' includes the TEMP SENSE #2.

The operation of the battery charging circuit 18' is similar to the operation described above for the battery charging circuit 18.

Figure 5:
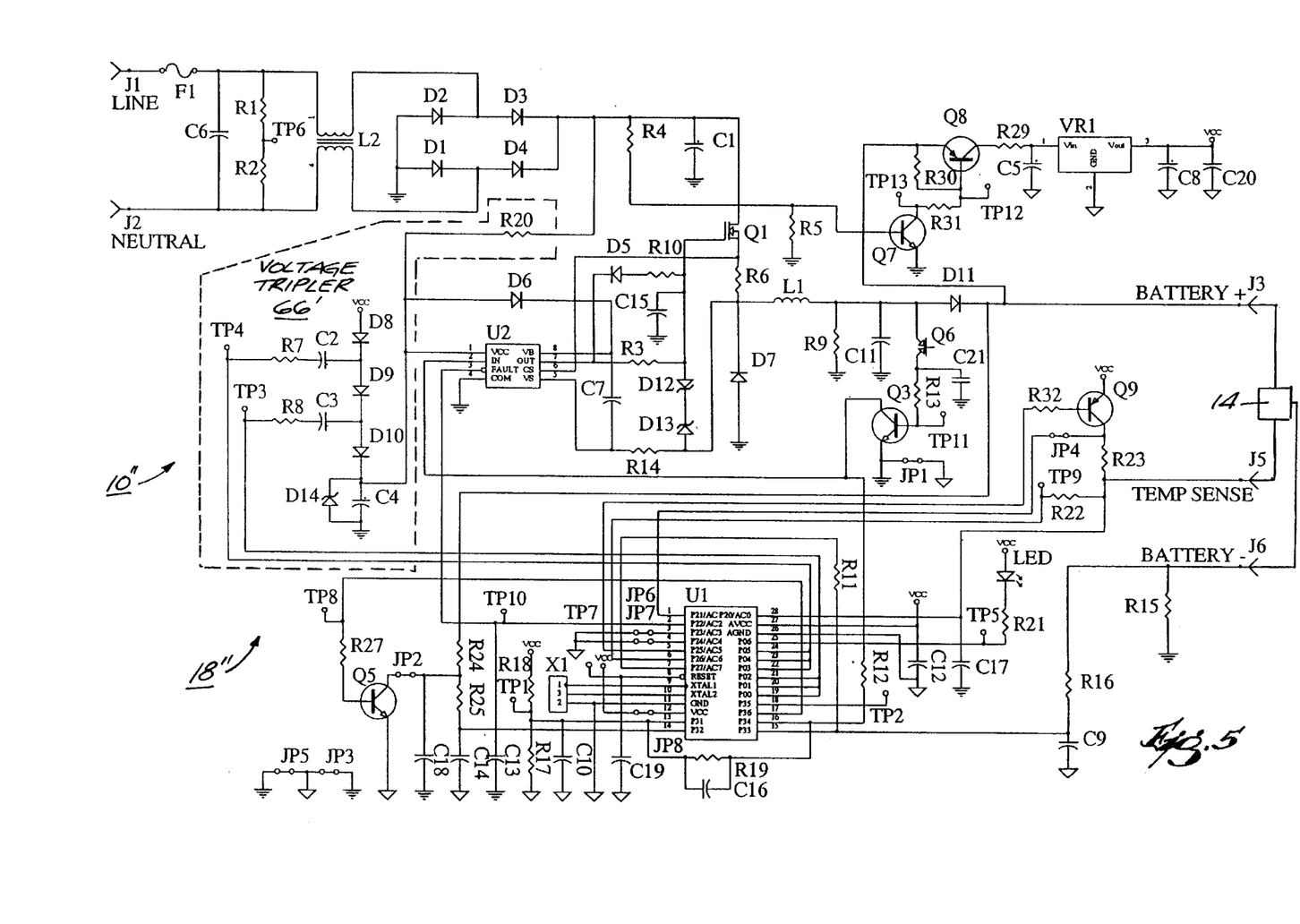
FIG. 5 is a schematic diagram of an alternative embodiment of the battery charging circuit illustrated in FIG. 2.

FIG. 5 illustrates yet another embodiment of the invention. In this embodiment, the battery charger 10" operates even if a deep discharged battery 14 is inserted within the battery charger 10". For example, the battery charger 10" operates if the initial voltage of the battery 14 is at least three volts.

For the embodiment shown in FIG. 5, the voltage tripler circuit 66' further includes a resistor R20 electrically connected to the input filter 30 and a zener diode D14 electrically connected across the capacitor C4. The connection created by the resistor R20 allows current flow from the input filter 30 to the voltage tripler circuit 66' and, consequently, allows power from the AC power source to charge capacitor C4. The zener diode D14 maintains or caps the voltage across the capacitor C4 to the zener diode breakdown voltage (e.g., fifteen volts). The capped voltage is the voltage required to operate the MOSFET driver U2 of the switch driver circuit 70. Due to the power provided from the input filter 30, the voltage of the power signal supplied by the voltage tripler 66' is not dependent upon the output voltage of the Microcontroller U1. Thus, the voltage tripler circuit 66' is not a true voltage tripler, but is a voltage regulator or controller.

In operation, when a battery 14 is inserted into the battery charger 10", the voltage regulator and associated circuitry turns on and generates a regulated Vcc signal. The Vcc signal powers the microprocessor U1 similar to what was described above for earlier embodiments. The Microcontroller U1 will operate if the voltage from the low voltage power supply 62 (i.e., Vcc) is sufficient to power the Microcontroller U1. For example, if the Microcontroller U1 requires a minimum of three volts to operate, then only a three volt Vcc is required to power the Microcontroller U1 and, thus, the battery 14 only requires a voltage of three volts to operate the battery charging circuit 18". Even further, if the Microcontroller U1 requires a minimum of one volt to operate, then only a one volt Vcc is required to power the Microcontroller U1 and, thus, the battery 14 only requires a voltage of one volt to operate the battery charging circuit 18".

However, a voltage greater than the Microcontroller Vcc voltage is required to operate or drive the MOSFET driver U2. The output of the Microcontroller U1 is applied to the voltage tripler circuit 66' for controlling the voltage tripler as is discussed above in other embodiments. But, unlike battery charger 10 or 10', additional power is provided from the input filter 30 to capacitor C4 and the voltage tripler 66' generates the necessary power or voltage signal to operate the switch driver 70. Thus, even if the battery 14 is in a deep discharged state (e.g., has a voltage as low as one volt), as long as the battery 14 has a sufficient voltage to power the Microcontroller U1, the battery charger 10" will charge the battery 14.

Figure 6:
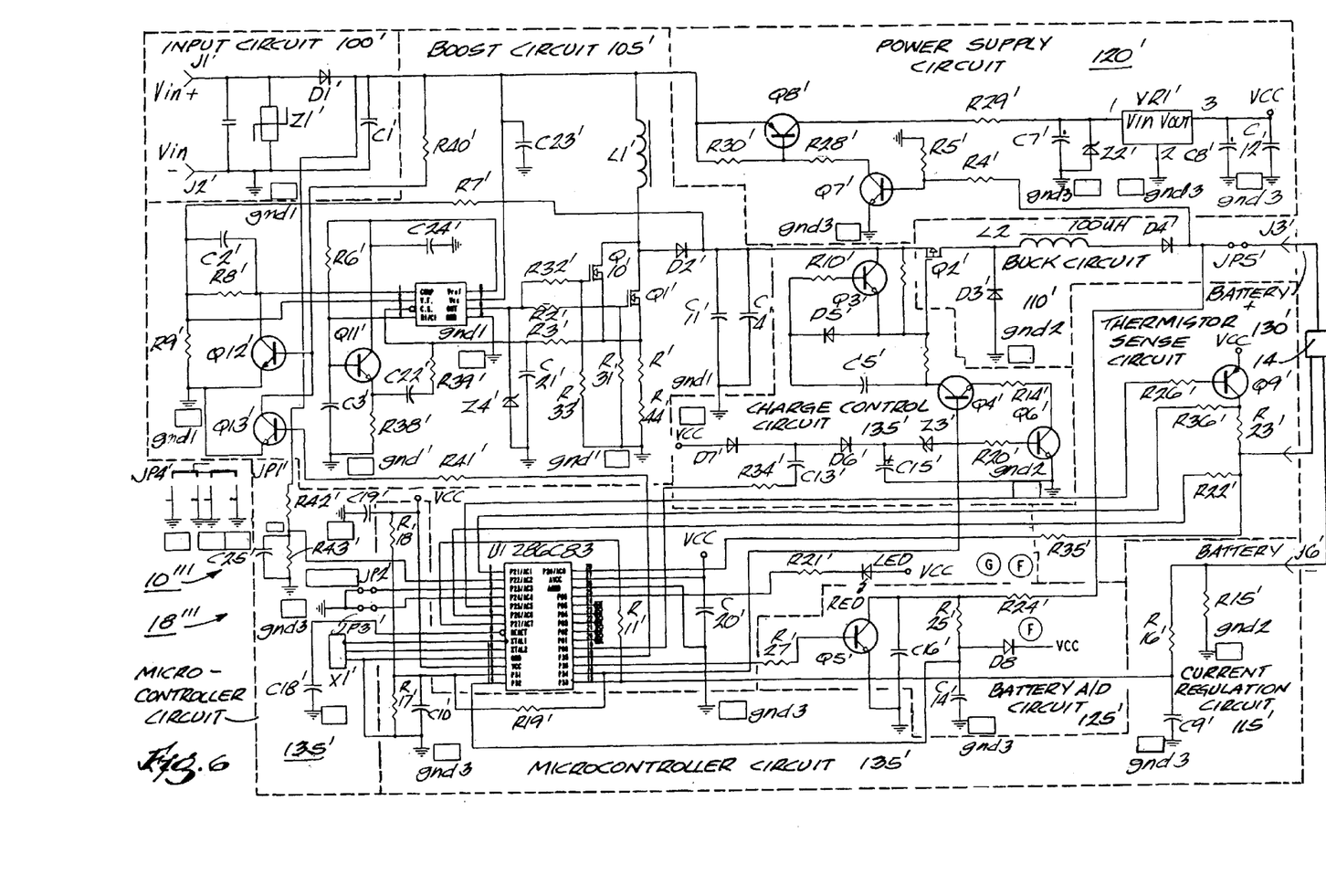
FIG. 6 is a schematic diagram of an alternative embodiment of a battery charging circuit powered by a direct current power source.
Figure 7:
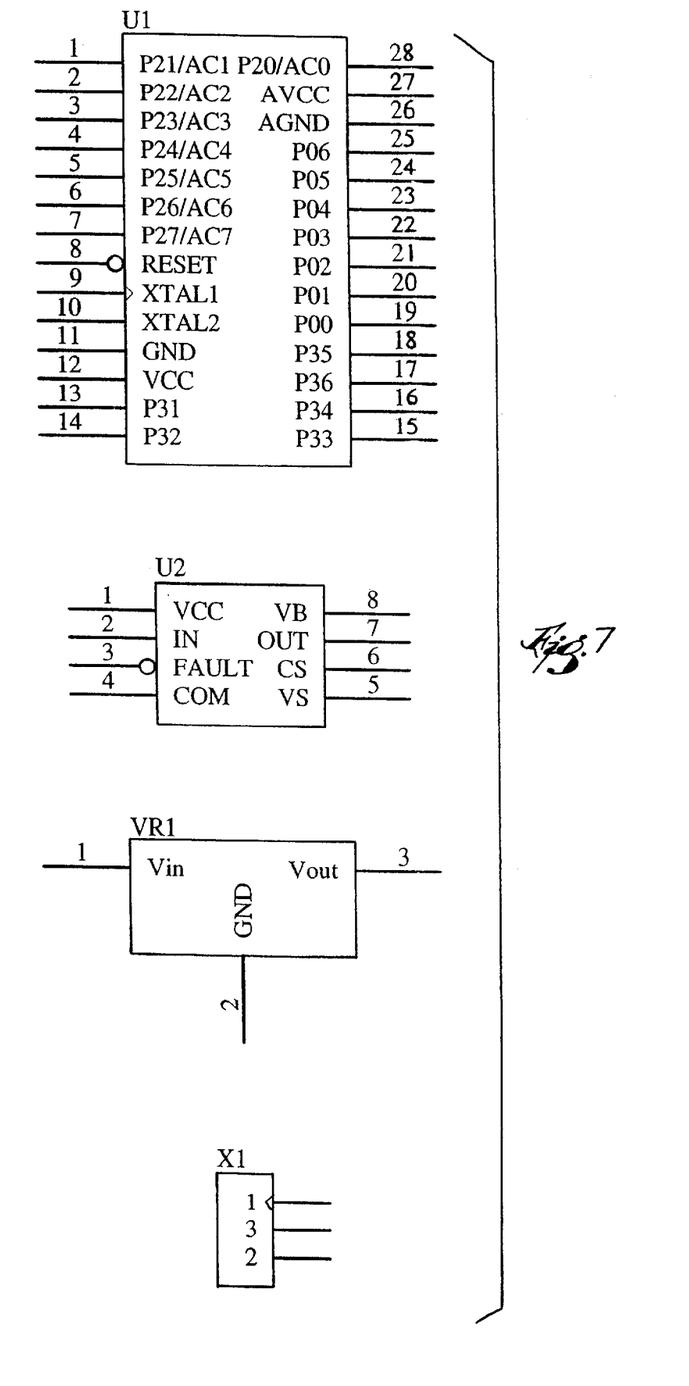
FIG. 7 is an enlarged view of components illustrated in FIGS. 3 and 4.

Another battery charger 10''' embodying the invention is schematically illustrated in FIG. 6. The battery charger 10''' is connectable to any type of DC power source or supply (not shown) including a vehicle DC power source (e.g., a car lighter jack). The battery charger 110''' charges a battery 14, which may be any voltage from 9.6 V to 18 V and may be any battery type. Similar to the battery charger 10, the battery charger 10''' is designed so that both a DC power source or input Vin' and battery 14 must be present to initiate charge. This keeps current consumption low if the charger is plugged in and no battery is present. It also ensures a Microcontroller U1' (discussed below) is reset at power-up each time a battery is inserted.

For the embodiment shown in FIG. 6, the battery charging circuit 18''' generally includes an input circuit 100' (diode D1', capacitor C1', and varistor Z1'), a boost circuit 105' (resistors R1', R2', R6', R7', R8', R9', R31', R32', R33', R38', R39', R40' and R44', capacitors C2', C3', C4', C11', C21', C22', C23' and C24', inductor L1', diode D2', zener diode Z4', field-effect transistors Q' and Q10', transistors Q11', Q12' and Q13', and driver U2'), a buck circuit 110' (transistor Q2', diodes D3' and D4', and inductor L2'), a current regulation circuit 115' (resistors R15', R16', R17', R18' and R19', and capacitor C9' and C10'), a power supply circuit 120' (resistors R4', R5', R28', R29' and R30', capacitor C7', C8' and C12', transistor Q7' and Q8', voltage regulator VR1', and zener diode Z2'), a battery A/D circuit 125' (resistors R24', R25' and R27', capacitors C14 and C16', transistor Q5', and diode D8'), a thermistor sense circuit 130' (resistors R22', R23', R26', R35' and R36', and transistor Q9'), a charge control circuit 135' (resistors R10', R12', R13', R14, R20' and R34', capacitors C5', C13' and C15', transistors Q3', Q4' and Q6', diodes D5', D6' and D7', and zener diode Z3'), and a Microcontroller circuit 135' (resistors R11', R21', R42' and R43', capacitors C18', C19', C20' and C25', Microcontroller U1', and LED1).

The following sections describe the functions of the individual circuit blocks. Each block represents a circuit function. Refer to the schematic diagram (FIG. 6) for information on the block locations and inter-connectivity.

Input Circuit

The input circuit includes diode D1', capacitor C1', varistor Z1', and a fused power cord (not shown). Diode D1' prevents energy generated by the boost circuit 105' from passing to the DC power source (e.g., a vehicle battery), and prevents the battery system from drawing energy away from C1'. Current from the DC source at Vin+ flows into capacitor C1' through diode D1'. Capacitor C1' charges to a voltage (e.g., about 0.4 V) below the Vin+ level. The capacitor C1' helps supply the large currents required by the boost circuit 105' when transistors Q1' and Q1' are turned on. Capacitor C1' is preferably a low ESR, high ripple current capacitor, chosen for low temperature rise during high charge/discharge operation. Varistor Z1' absorbs any voltage spikes that may be generated on input from the DC power supply. The power cord includes a vehicle adapter plug, a fuse and a SPT-2cable. The fuse protects the vehicle's electrical system in the event of a short circuit at the charger input.

In one embodiment, the charger input is fused at the cordset plug, to prevent damage to a vehicle electrical system and to protect everything external to the plug, such as the charger and cord. For an output short circuit to occur, another component in the circuit, such as Q2', must first fail.

Boost Circuit

For the boost circuit 105', driver U2' controls the conduction of transistors Q1' and Q10' to maintain the desired voltage at capacitors C4' and C11'. A portion of the voltage at capacitor C4' is seen at driver U2' via a voltage divider (resistors R7' and R9'). The voltage seen at driver U2' is compared to an internal reference voltage. Driver U2' turns the transistors on cyclically, at a frequency set by resistor R6' and capacitor C3'. The frequency of these cycles is preferably set to greater than twice the maximum charging frequency, to reduce interference or noise in the circuit. Driver U2' keeps the transistor Q1' and Q10' output on long enough each cycle to hold the capacitor C4' voltage to the desired level. Regulator U2' has an internal shutdown that disables the device if the DC input is below a required voltage for maintaining charging power (e.g., nine volts).

As the transistors Q1' and Q10' conduct, current flows from the input circuit through inductor L1' and transistors Q1' or Q10'. Energy is stored in the magnetic field of inductor L1'. When the transistors turn off each cycle, most of this energy is dumped to capacitors C4' and C11' via diode D2'. The transistors Q1' and Q10' are used in parallel to keep their internal temperatures cooler.

Current-mode operation of the boost converter may be improved by adding the slope compensation circuit including transistor Q11', capacitor C22', and resistors R38' and R39', and by increasing the value of the current sense resistor R1' by adding resistor R44' in series. The slope compensation circuit injects a portion of the voltage imposed on the oscillator capacitor C3' into the current sense input of regulator U2' (pin 3). The input signal helps force the transistors Q1' and Q10' to switch at the frequency determined by resistor R6' and capacitor C3'. The larger the current sense resistor R1' and R44', the more of the inductor L1' charge current is required to be introduced to driver U2' and allowing better cycle-by-cycle duty adjustments. The addition of capacitor C21' slows the current sense input response, reducing the effects of noise in the circuit.

The two storage capacitors, C4' and C11', are preferably low ESR, high ripple current capacitors for supplying the charging current to the buck circuit 110'. Two capacitors are used to improve ripple current capability and keep internal temperatures lower. Of course, any number of capacitors can be used.

Resistors R40' and R41', and transistors Q12' and Q13' hold the boost circuit 105' off at any time until the Microcontroller U1' allows the circuit 18''' to operate by setting Microcontroller U1' high (pin 18). This keeps the current draw from the DC supply to a minimum value unless a battery is inserted.

The ground planes in the circuit are designed so that all boost grounds are tied together at the J2' terminal (Vin−). Additionally, high current boost ground may be separate from driver U2' ground.

Buck Circuit

The buck circuit 110' delivers energy to the battery being charged. When transistor Q2' is turned on, current passes from capacitors C4' or C11', through transistor Q2', through inductor L2', and diode D4' to the battery 14. A magnetic field builds in inductor L2', which stores energy. When transistor Q2' is turned off, this energy is released to the battery 14, with current flowing from inductor L2' to the battery 14, and diode D3'. Transistor Q2' is switched at a frequency determined by the current regulation circuit (discussed below). Diode D4' prevents the battery 14 from powering the battery circuit 18''' if the DC power source is removed.

The battery circuit 18''' is designed so that transistor Q2' is driven by the Microcontroller U1'. If the battery 14 is removed, the Microcontroller U1' loses power, and transistor Q2' is held off. The buck circuit 110' and charge control circuit 135' grounds are common, and are separate from other grounds. Also, the charge current through resistor R15' passes through this ground. This ground is connected to the other grounds at J2'.

Current Regulation Circuit

For the current regulation circuit 115', as charging current flows through the battery 14, voltage is developed across resistor R15'. A comparator internal to the Microcontroller U1' uses this voltage to switch the charging current on or off. The voltage across resistor R15' is filtered by resistor R16' and capacitor C9'. The comparator reference and feedback levels are set by resistors R17', R18', and R19'. Capacitor C10' filters the reference voltage developed across resistor R17'.

Power Supply Circuit

The power supply circuit 120' is driven by the DC source Vin'. The battery 14 under charge must also be present for the battery charger 10''' to operate. When a battery 14 is inserted, transistor Q7' conducts, which in turn causes transistor Q8' to conduct. Current from the DC input supplies voltage regulator VR1', which provides the regulated Vcc (e.g., five volts). Transistor Q7' allows the circuit to operate if the battery voltage is greater than a low voltage (approximately two volts) and greater than a low current (approximately eight-hundred microamps). This allows deeply discharged batteries to be charged. Additionally, transistor Q7' is designed to draw only one mA to two mA from a charged pack left in an unpowered charger.

Battery A/D Circuit

For the battery A/D circuit 125', the battery voltage is measured using the Microcontroller's A/D input, and the circuit formed by resistors R24' and R25', capacitor C14, and transistor Q5'. When the battery voltage is measured, charger operation is interrupted to allow a more accurate measurement. Capacitor C14 is allowed to charge via resistors R24' and R25' to a certain level, and then is discharged through resistor R25' and transistor Q5'. Comparing the charge and discharge rates of capacitor C14 allows better resolution of the actual battery voltage. The diode D5' is used to protect the Microcontroller U1' from high voltage, by clamping capacitor C14 (e.g., to about 5.5 volts).

Thermistor Sense Circuit

For the thermistor sense circuit 130', temperature readings for the battery 14 are made using the thermistor sense circuit 130'. When the Microcontroller U1' comes out of reset, the voltage between the terminals J5' and J6' is measured. The results indicated if a NiCd or NimH battery is inserted, or if the thermistor connection is open. The battery 14 temperature is inferred from the voltage at pin J5'. The voltage is created by the voltage divider of resistor R22', the thermistor (for NiCd packs), or resistor R23' and the thermistor (for NimH packs).

Charge Control Circuit

The charge control circuit 135' controls conduction of Q2'. The Microcontroller U1' controllably switches transistors Q2', Q3' and Q4'. Transistors Q3' and Q6', resistors R10', R12', R13' and R14, diode D5', and capacitor C5' turn transistor Q2' on and off quickly to reduce switching losses. Transistor Q2' is turned on only when the transistor Q6' drive circuit is active. Capacitors C13' and C15', diodes D7' and D8' and resistor R34' make up a voltage doubling circuit which drives transistor Q6'. The voltage doubling circuit requires pin 19 of the Microcontroller U1' to oscillate from Vcc to zero volts to produce a voltages greater than Vcc (e.g., approximately 6.2V) at the zener diode Z3'. This voltage causes zenere diode Z3', and transistor Q6' to conduct and completing the transistor Q2' control circuit.

Microcontroller Circuit

For the Microcontroller circuit 135', The Microcontroller U1' controls charging by using the information brought in from other parts of the charger such as the battery A/D circuit 125', and the thermistor sense circuit 130'. At power up, the Microcontroller U1' enables the thermistor sense circuit 130', reads the information from this circuit, and determines the battery 14 type. If no thermistor is sensed, operation stops before the charge circuits are enabled.

The Microcontroller U1' also calculates the battery 14 temperature. If the battery 14 is between 5° C. and 45° C., normal fast charging will be allowed. If the pack is below −10° C. or above 60° C., a trickle charge is generated. Between the fast charge and trickle charge temperatures, the pack is charged with a step charge. The Microcontroller U1' also measures the voltage of the battery 14 using the battery A/D circuit 125'.

The Microcontroller U1' enables the comparator in the current regulation circuit 115', causing pin 19' to oscillate and turning transistor Q6' on. It also allows the boost circuit 105' to operate by setting pin 18' high. At this point, charging via transistor Q2' begins.

The current regulation circuit 115' operates independently of the Microcontroller U1' except when measurements are made at calculated intervals (e.g., five seconds). The voltage divider of resistors R42' and R43' allow operation below a ten volt supply. The Microcontroller U1' measures the input voltage at capacitor C1' via this voltage divider of resistors R42' and R43'. If the voltage falls below ten volts, the buck circuit 110' operates outside of the current regulation limits. This allows the charger 10" to operate with input voltages as low as nine volts.

The Microcontroller circuit 135' and other noise-sensitive circuits such as the thermistor sense circuit 130' and the battery A/D circuit 125' have a separate low current ground. This ground is connected to the other grounds at pin J2'.

To begin charging a battery 14, both the power supply circuit 120' and the Microcontroller U1' must be operating properly. If the voltage doubler in the charge control circuit 135' is not driven by the Microcontroller U1', then Q2' cannot be turned on. The boost circuit 105' is enabled by the Microcontroller U1' via resistors R41' and transistor Q13' when it is reset at battery 14 insertion. If no battery 14 is present, the voltage at the buck circuit 110' will be less than the DC supply. Also, if the DC supply voltage is less than nine volts, the circuit will not operate.

Various features of the invention are set forth in the following claims.

We claim:

1. A battery charger comprising:
    a battery charging circuit connectable to a power source and to a battery and operable to charge the battery; and
    a Microcontroller electrically connected to and for operating said circuit, the battery, when connected to said circuit, supplying power to operate said Microcontroller.

2. The charger as set forth in claim 1 wherein the battery is chargeable to a charged state having a charged voltage of at least 5 volts, wherein, when the battery is connected to said circuit and in a depleted state having a voltage of less than 5 volts, said Microcontroller is supplied with the depleted state voltage of less than 5 volts and operates said circuit to charge the battery.

3. The charger as set forth in claim 2 wherein, when the battery is connected to said circuit and in the depleted state having a voltage of less than 3 volts, said Microcontroller is supplied with the depleted state voltage of less than 3 volts and operates said circuit to charge the battery.

4. The charger as set forth in claim 1 wherein said battery charging circuit is electrically connectable to an AC power source to charge the battery.

5. The charger as set forth in claim 1 wherein said battery charging circuit is electrically connectable to a DC power source to charge the battery.

6. A method for operating a battery charger, the battery charger including a battery charging circuit connectable to a power source and to a battery and operable to charge the battery, and a Microcontroller electrically connected to and for operating the circuit, said method comprising the acts of:
    providing a battery;
    connecting the battery to the circuit; and
    supplying power from the battery to the Microcontroller to operate the Microcontroller.

7. The method as set forth in claim 6 and further comprising the act of electrically connecting the circuit to the power source.

8. The method as set forth in claim 7 wherein said electrically connecting act includes electrically connecting the circuit to an AC power source.

9. The method as set forth in claim 7 wherein said electrically connecting act includes electrically connecting the circuit to a DC power source.

10. The method as set forth in claim 6 wherein the battery is chargeable to a charged state having a charged voltage of at least 5 volts, wherein, when the battery is connected to said circuit and in a depleted state having a voltage of less than 5 volts, said supplying act includes supplying the depleted state voltage of less than 5 volts from the battery to the Microcontroller to power the Microcontroller such that the Microcontroller operates the power switch means to charge the battery.

11. The method as set forth in claim 10 wherein, when the battery is connected to said circuit and in the depleted state having a voltage of less than 3 volts, said supplying act includes supplying the depleted state voltage of less than 3 volts from the battery to the Microcontroller to power the Microcontroller such that the Microcontroller operates the power switch means to charge the battery.

12. A combination for charging a battery, said combination comprising:
   a battery;
   a power source;
   a battery charging circuit connectable to the power source and to the battery and operable to charge the battery; and
   a Microcontroller electrically connected to and for operating the circuit, the battery, when connected to the circuit, supplying power to operate the Microcontroller.

13. The combination as set forth in claim 12 wherein the battery is chargeable to a charged state having a charged voltage of at least 5 volts, wherein the battery, when connected to the circuit and when in a depleted state having a voltage of less than 5 volts, supplies the depleted state voltage of less than 5 volts to operate the Microcontroller.

14. The combination as set forth in claim 13, wherein the battery, when connected to the circuit and when in a depleted state having a voltage of less than 3 volts, supplies the depleted state voltage of less than 3 volts to operate the Microcontroller.

15. The combination as set forth in claim 12 wherein the power source is an AC power source.

16. The combination as set forth in claim 12 wherein the power source is a DC power source.

17. The charger as set forth in claim 1 and further comprising a power switch to control a transfer of power from the power source to the battery in response to a control signal generated by said Microcontroller, and wherein the battery, when connected to said circuit, supplies power to power said power switch.

18. A method of charging a battery, the method comprising the acts of:
   providing a battery charger having a Microcontroller and a terminal;
   electrically connecting the battery charger to a power source;
   electrically connecting the battery to the terminal of the battery charger;
   activating the Microcontroller in response to electrically connecting the battery to the terminal of the battery charger; and
   transferring power from the power source to the battery in response to activating the Microcontroller.

19. The method as set forth in claim 18 wherein the act of activating the Microcontroller occurs after the act of electrically connecting the battery charger to the power source.

20. The method as set forth in claim 18 wherein the act of activating the Microcontroller includes the act of powering the Microcontroller with power from the battery.

21. The method as set forth in claim 20 wherein the act of powering the Microcontroller includes the act of powering the Microcontroller with a battery voltage of less than five volts.

22. The method as set forth in claim 21 wherein the act of powering the Microcontroller includes the act of powering the Microcontroller with a battery voltage of less than three volts.

23. The method as set forth in claim 21 wherein the act of transferring power from the power source to the battery charges the battery to a charged voltage of at least five volts.

24. The method as set forth in claim 18 wherein the act of activating the Microcontroller includes the acts of
   enabling a switch with power from the battery in response to electrically connecting the battery to the terminal of the battery charger, and
   powering the Microcontroller with power from the power source in response to enabling the switch with power from the battery.

25. The method as set forth in claim 24 wherein the act of enabling a switch includes the act of enabling the switch with a battery voltage less than five volts.

26. The method as set forth in claim 25 wherein the act of transferring power from the power source to the battery charges the battery to a charged voltage of at least five volts.

27. The method as set forth in claim 26 wherein the act of enabling a switch includes the act of enabling the switch with a battery voltage less than two volts.

28. The method as set forth in claim 18 wherein the act of electrically connecting the battery charger to a power source includes electrically connecting the battery charger to a direct current power source.

29. The method as set forth in claim 28 wherein the act of electrically connecting the battery charger to a power source includes electrically connecting the battery charger to a vehicle battery.

30. The method as set forth in claim 28 wherein the act of electrically connecting the battery charger to a power source includes electrically connecting the battery charger to a alternating current power source.

31. The method as set forth in claim 18 wherein the charger is operable to charge a first type of battery and a second type of battery, and wherein the method further comprises, prior to the act of transferring power:
   identifying the chemistry of the battery; and
   providing a signal to the Microcontroller identifying the chemistry of the battery.

32. The method as set forth in claim 18 wherein the battery charger includes a power switch to control the transfer of power from the power source to the battery in response to a control signal, wherein the method further comprises powering the power switch in response to electrically connecting the battery to the terminal of the battery charger, and wherein the act of transferring power includes controlling the power switch with a control signal from the Microcontroller.

33. The method as set forth in claim 32 wherein the act of activating the power switch includes the act of powering the power switch with power from the battery.

34. A battery charger for charging a battery with power from a power source, the battery charger comprising:
   an input terminal electrically connectable to the power source;
   a power switch electrically connected to the input terminal and operable to controllably transfer power from the power source to the battery in response to receiving a control signal;
   an output terminal electrically connected to the power switch and electrically connectable to the battery; and
   a controller electrically connected to the power switch and to the output terminal, the controller being powered by the battery and being operable to generate the control signal in response to being powered.

35. The battery charger as set forth in claim 34 wherein the battery charger charges the battery from a depleted state having a depleted-state voltage to a non-depleted state, and wherein the controller is operable to be powered by the battery having the depleted-state voltage.

36. The battery charger as set forth in claim 35 wherein the depleted-state voltage is less than five volts.

37. The battery charger as set forth in claim 35 wherein the depleted-state voltage is less than three volts.

38. The battery charger as set forth in claim 34 and further comprising a switch driver electrically connected to the power switch and the Microcontroller, wherein the control signal generated by the Microcontroller is a first control signal, wherein the power switch receives the first control signal and generates a second control signal in response to the first control signal, and wherein the power switch receives the second control signal and transfers power from the power source to the battery in response to receiving the second control signal.

39. The battery charger as set forth in claim 38 wherein the Microcontroller powers the switch driver.

40. The battery charger as set forth in claim 39 further comprising a voltage tripler electrically connected to the Microcontroller and to the switch driver, wherein the Microcontroller generates a power signal having a first voltage, wherein the voltage tripler receives the power signal from the Microcontroller and increases the power signal to a second voltage, and wherein the power signal having the second voltage powers the switch driver.

41. The battery charger as set forth in claim 34 wherein the power source is an alternating current power source.

42. The battery charger as set forth in claim 34 wherein the power source is a direct current power source.

43. A combination for charging a battery, the combination comprising:

a battery; and a battery charger including a power switch electrically connectable to a power source and connected to the battery, the power switch being operable to controllably transfer power from the power source to the battery in response to a control signal, and a Microcontroller electrically connected to the battery and to the power switch, the Microcontroller being powered by the battery and being operable to generate the control signal when being powered.

44. The combination as set forth in claim 43 wherein the battery charger charges the battery from a depleted state having a depleted-state voltage to a non-depleted state, and wherein the controller is operable to be powered by the battery having a depleted-state voltage.

45. The combination as set forth in claim 44 wherein the depleted-state voltage is less than five volts.

46. The combination as set forth in claim 44 wherein the depleted-state voltage is less than three volts.

47. The combination as set forth in claim 44 wherein the Microcontroller further comprises a switch driver electrically connected to the power switch and to the Microcontroller, wherein the control signal generated by the Microcontroller is a first control signal, wherein the power switch receives the first control signal and generates a second control signal in response to the first control signal, and wherein the power switch receives the second control signal and transfers power from the power source to the battery in response to receiving the second control signal.

48. The combination as set forth in claim 44 wherein the Microcontroller powers the switch driver.

49. The combination as set forth in claim 44 wherein the battery charger further comprises a voltage tripler electrically connected to the Microcontroller and the switch driver, wherein the Microcontroller generates a power signal having a first voltage, wherein the voltage tripler receives the power signal from the Microcontroller and increases the power signal to a second voltage, and wherein the power signal having a second voltage powers the switch driver.

* * * * *